US009600437B2

United States Patent
Cho

(10) Patent No.: US 9,600,437 B2
(45) Date of Patent: Mar. 21, 2017

(54) APPARATUS FOR SETTING NETWORK OF PROCESS FIELD BUS DECENTRALIZED PERIPHERY

(71) Applicant: LSIS CO., LTD., Anyang-si, Gyeonggi-do (KR)

(72) Inventor: Duk Yun Cho, Suwon-si (KR)

(73) Assignee: LSIS CO., LTD., Anyang-si (KR)

( * ) Notice: Subject to any disclaimer, the term of this patent is extended or adjusted under 35 U.S.C. 154(b) by 215 days.

(21) Appl. No.: 14/254,732

(22) Filed: Apr. 16, 2014

(65) Prior Publication Data

US 2014/0337551 A1 Nov. 13, 2014

(30) Foreign Application Priority Data

May 13, 2013 (KR) ........................ 10-2013-0053598

(51) Int. Cl.
| | |
|---|---|
| *G06F 13/00* | (2006.01) |
| *G06F 13/42* | (2006.01) |
| *H04L 12/403* | (2006.01) |
| *H04L 12/40* | (2006.01) |

(52) U.S. Cl.
CPC ........ *G06F 13/4282* (2013.01); *H04L 12/403* (2013.01); *G05B 2219/31103* (2013.01); *G05B 2219/31138* (2013.01); *H04L 2012/40221* (2013.01); *Y02P 90/18* (2015.11)

(58) Field of Classification Search
CPC ....... G06F 13/4063; G05B 2219/31138; H04L 2012/40221
See application file for complete search history.

(56) References Cited

U.S. PATENT DOCUMENTS

| | | | |
|---|---|---|---|
| 6,098,116 A | 8/2000 | Nixon et al. | |
| 6,449,715 B1 | 9/2002 | Krivoshein | |

FOREIGN PATENT DOCUMENTS

| | | |
|---|---|---|
| CN | 103197615 | 7/2013 |
| GB | 2394630 | 4/2004 |

OTHER PUBLICATIONS

Profibus, "Profile Guidelines, Part 3, Diagnosis, Alarms and Time Stamping," Version 1.0, Jul. 2004, Order No. 3.522, 65 pages.
(Continued)

*Primary Examiner* — Ernest Unelus
(74) *Attorney, Agent, or Firm* — Lee Hong Degerman Kang & Waimey

(57) ABSTRACT

The present disclosure includes a master device, a plurality of slave devices performing a communication through Profibus and a configuration tool providing network configuration information of Profibus DP by generating the network configuration information, wherein the configuration tool includes an automatic configuration module configured to request the master device of information relative to the plurality of slave devices in response to an automatic configuration command inputted through a user communication module, to receive the information and provide profiles of relevant types by determining the types of the plurality of slave devices using the received information, and a network configuration information configured to generate the network configuration information in response to the types and profiles determined by the automatic configuration module and to provide the network configuration information to the master device.

3 Claims, 5 Drawing Sheets

(56) References Cited

OTHER PUBLICATIONS

European Patent Office Application Serial No. 14165625.6, Search Report dated Jan. 23, 2015, 7 pages.
Korean Intellectual Property Office Application Serial No. 10-2013-0053598, Office Action dated Aug. 22, 2016, 4 pages.
The State Intellectual Property Office of the People's Republic of China Application No. 201410200907.2, Office Action dated Jan. 5, 2017, 5 pages.

APPARATUS FOR SETTING NETWORK OF PROCESS FIELD BUS DECENTRALIZED PERIPHERY

Pursuant to 35 U.S.C. §119(a), this application claims the benefit of earlier filing date and right of priority to Korean Patent Application No. 10-2013-0053598, filed on May 13, 2013, the contents of which are hereby incorporated by reference in their entirety.

BACKGROUND OF THE INVENTION

Field of the Invention

The present disclosure relates to an apparatus for automatically setting network of PROFIBUS DP (PROcess Field Bus Decentralized Periphery) configured to allow a Profibus master and a plurality of Profibus slaves to perform a mutual communication through a Profibus network.

Description of Related Art

Generally, Profibus is one of names of a family of industrial network communication protocols used for real-time distributed control, now standardized as IEC (International Electro-technical Commission) 61158, and used for real time communication among field devices in various industrial fields including manufacturing fields, process control fields and building automation fields.

The Profibus is classified, based on applicable fields, into FMS (Field Message Specification), Profibus DP (Decentralized Periphery) and Profibus PA (Process Automation), and Profibus DP is widely used for factory automation fields.

A network of Profibus DP includes a master and a plurality of slaves for input and output of data, and communication between the master and the plurality of slaves is performed through network configuration information stored in the master of the Profibus DP. The network configuration information includes communication speed information of the plurality of slaves to communicate with the master of Profibus DP and input/output information.

SUMMARY OF THE INVENTION

The present disclosure is directed to provide an apparatus for setting network of Profibus DP configured to obtain automatic configuration information capable of automatically setting a network by performing a communication with a master and a plurality of slaves, and to set a Profibus DP network by application of the obtained automatic configuration information.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided an apparatus for setting network of PROFIBUS DP, the apparatus comprising:
a master device;
a plurality of slave devices configured to perform a communication with the master device through Process field bus; and
a configuration tool configured to generate network configuration information of the Profibus DP and provide the information to the master device, wherein
the configuration tool includes an automatic configuration module configured to request the master device of information relative to the plurality of slave devices in response to an automatic configuration command inputted through a user communication module, to receive the information and provide profiles of relevant types by determining the types of the plurality of slave devices using the received information, and a network configuration module configured to generate the network configuration information in response to the types and profiles determined by the automatic configuration module and to provide the network configuration information to the master device.

Preferably, but not necessarily, the automatic configuration module may include a slave information collector configured to request information on the plurality of slave devices to the master device, and to collect the requested information of the plurality of slave devices, and a GDS (Generic Station Description) comparator configured to determine the types of plurality of slave devices by comparing the information of the plurality of slave devices collected by the slave information collector with information pre-stored in database, and to provide a profile corresponding to the determined types to the network configuration module by reading out the profile from the database.

Preferably, but not necessarily, the network configuration module may include a network topology encoder configured to generate a network topology according to the types determined by the automatic configuration module, encode the network topology and provide the encoded network topology to communication information, a GDS interpreter configured to interpret the profile according to the network topology and to extract data necessary for the network configuration information, a GSD encoder configured to encode the data extracted by the GSD interpreter, and a configuration generator configured to generate the network configuration information by converting the data encoded by the GSD encoder and the communication information provided by the network topology encoder to a binary data, and to provide the generated network configuration information to the master device.

Preferably, but not necessarily, the master device may request the plurality of slave devices the configuration information necessary for automatic configuration in response to the automatic configuration request of the automatic configuration module, and the plurality of slave devices may provide to the master device the configuration information on what type of slave devices it is.

Preferably, but not necessarily, the configuration tool may further include a master communication module configured to perform a communication with the master device.

In an advantageous effect, the apparatus for setting network of Profibus DP according to the present disclosure, a configuration tool automatically collects information of a plurality of slave devices through a master device to configure a network using the collected information, whereby a user convenience can be enhanced, and an operator safety can be secured because the plurality of slave devices installed at a dangerous place is not required to be checked one by one.

Another advantageous effect is that the configuration of network can be automatically checked to enable a check of an area where the network is not accurately installed, whereby maintenance and repair are simply performed, and generation of errors caused by input error by an operator can be prevented.

BRIEF DESCRIPTION OF THE DRAWINGS

Now, the non-limiting exemplary embodiments of the present disclosure will be described in detail with reference

DETAILED DESCRIPTION OF THE INVENTION

The following detailed description of the embodiments of the present disclosure is not intended to limit the scope of the disclosure, as claimed, but is merely representative of possible embodiments of the disclosure. Consequently, the embodiments described herein are further intended to explain modes known of practicing the invention and to enable others skilled in the art to utilize the invention in such, or other embodiments and with various modifications required by the particular application(s) or use(s) of the present disclosure.

Figure 1:
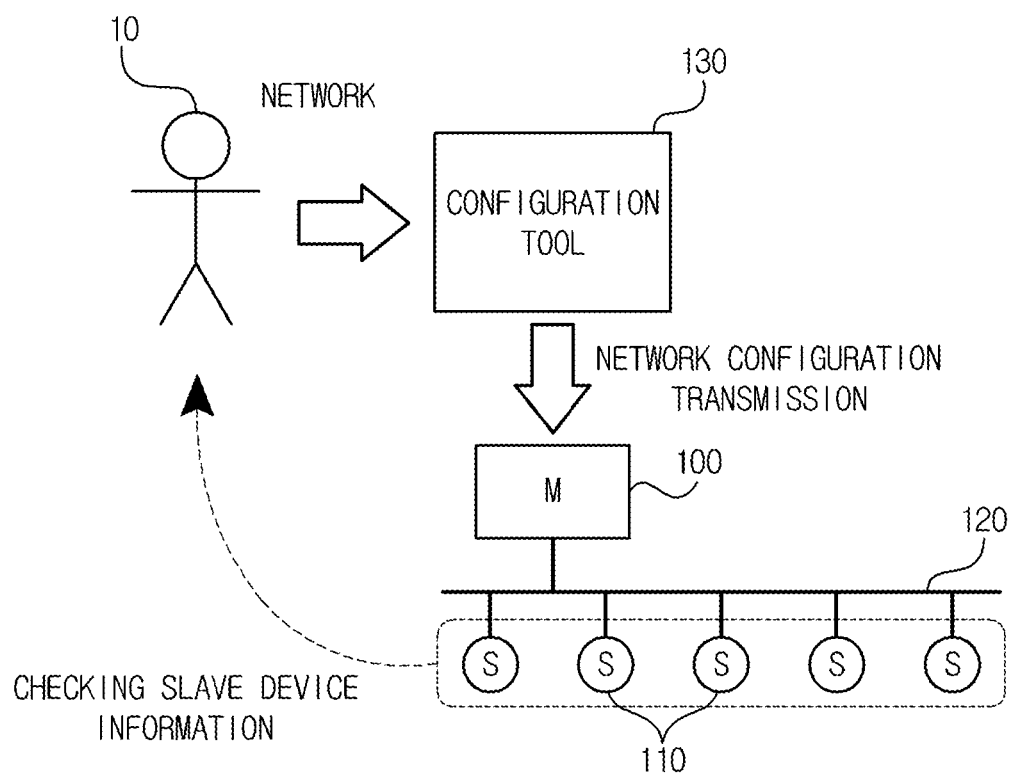
FIG. 1 is a schematic view illustrating a network configuration concept according to prior art.

FIG. 1 is a schematic view illustrating a network configuration concept according to prior art, where reference numeral 100 is a master device, 110 is a plurality of slave devices. The master device (100) and the plurality of slave devices are connected via Profibus (120) to enable a mutual transmission of a predetermined data. Reference numeral 130 is a configuration tool, where the configuration tool (130) performs a network configuration operation of the master device (100).

Figure 2:
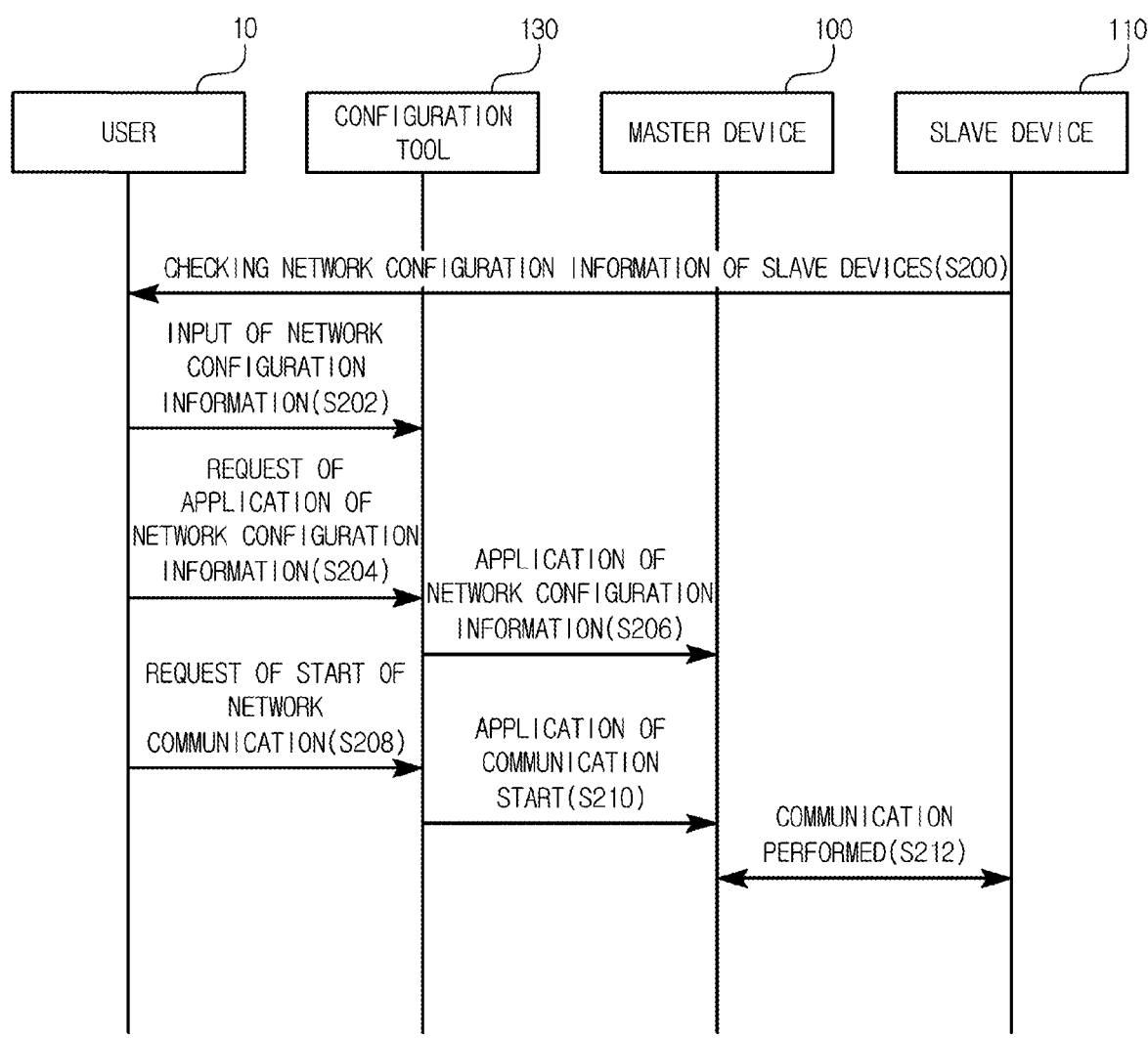
FIG. 2 is a schematic view illustrating a sequence of network configuration operation according to prior art.

FIG. 2 is a schematic view illustrating a sequence of network configuration operation according to prior art.

Turning to FIG. 2, a user (10) checks (confirms) network configuration information of a plurality of slave devices (110) in order to set up a network of Profibus DP (S200). For example, the user (10) checks the network configuration information such as addresses of the plurality of slave devices (110), communication speed information and input/output data information.

At this time, the user (10) may also move to an installation place of the plurality of slave devices to check the network configuration information. Furthermore, the user (10) inputs the network configuration information into a configuration tool (130) (S202), and requests the application of the network configuration information when the input of the network configuration information is completed (S204).

Successively, the configuration tool (130) is applied by transmitting the network configuration information to the master device (100) (S206). Under this circumstance, the user (10) requests the configuration tool (130) of start of network communication (S208). Then, the configuration tool (130) requests the master device (100) the application of communication start (S210), and upon request of the application request of the communication start, the master device (100) performs the communication through the Profibus (120) based on the plurality of slave devices (110) and the network configuration information.

The conventional network set-up is such that the network configuration information relative to each of the plurality of slave devices is checked in advance by a user, and the network configuration information is inputted by the user to each of the plurality of slave devices through the configuration tool. Thus, the user suffers from cumbersomeness of checking (confirm) in advance the network configuration information relative to each of the plurality of slave devices. In addition, the user also suffers from being exposed to danger because the user must check the network configuration information of the slave devices when the user must personally visit a place where the plurality of slave devices is installed. The user still suffers from another disadvantage in that an error may occur due to erroneous input of the network configuration information because the user must directly input the confirmed network configuration information of the plurality of slave devices to the configuration tool.

Figure 3:
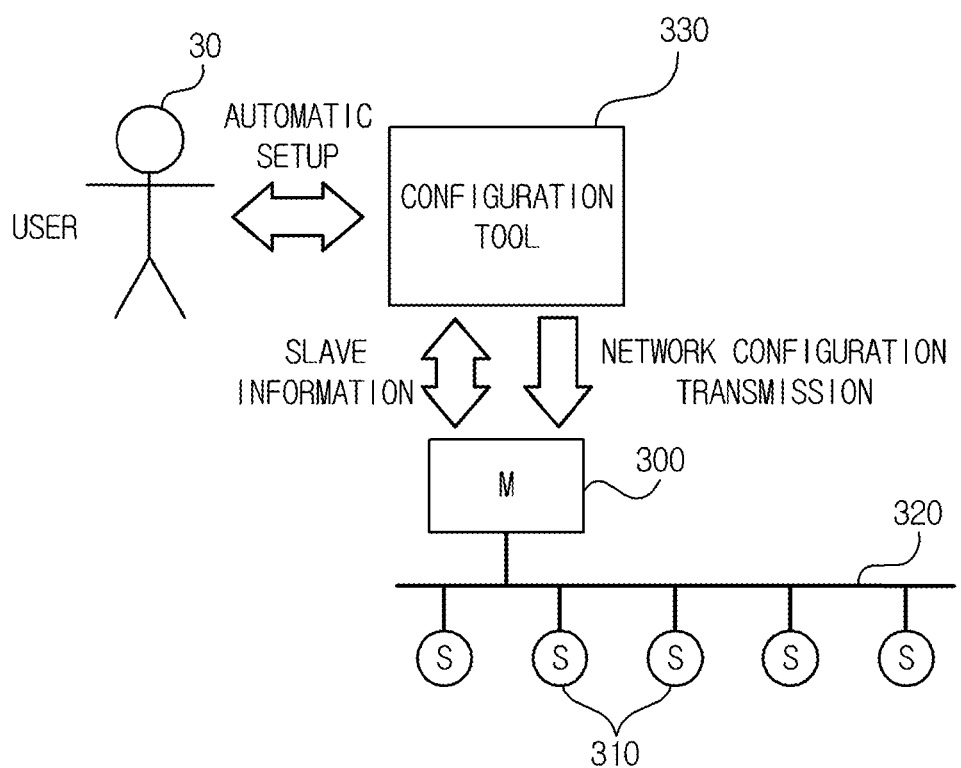
FIG. 3 is a schematic view illustrating a network configuration concept according to the present disclosure.

FIG. 3 is a schematic view illustrating a network configuration concept according to the present disclosure, where reference numeral 300 is a master device and 310 is a plurality of slave devices. The master device (300) and the plurality of slave devices (310) is configured to be connected via Profibus (320) to perform the mutual communication. Reference numeral 330 is a configuration tool, and the configuration tool (330) performs the network configuration operation of the master device (300) in response to manipulation of a user (30).

The present disclosure thus configured is such that the user (30) manipulates the configuration tool (330) to request for automatic network setting.

Successively, the configuration tool (330) requests the master device (300) of automatic setting information necessary for automatic network setting, and the master device (300), upon the request, performs the communication through the plurality of slave devices (310) and the Profibus (320) to request the configuration information and receives the configuration information transmitted by the plurality of slave devices (310) in response to the request of the configuration information.

Furthermore, when the receipt of the configuration information is completed, the master device (300) notifies the configuration tool (330) of the completion of receipt of automatic setting information, where the configuration tool (330) automatically notifies the user (30) of the completion of preparation of setting the network.

Under this circumstance, when the user (30) requests the application of the network configuration information by manipulating the configuration tool (330), the configuration tool (330) request the master device (300) of application of network configuration information whereby the network configuration information can be applied. Furthermore, when the user (30) manipulates the configuration tool (330) to request the start of the network communication, the configuration tool (330) requests the master device (300) of the start of the network communication, and the master device (300) and the plurality of slave devices (310) perform the mutual communication through the Profibus (320) in response to the request.

Figure 4:
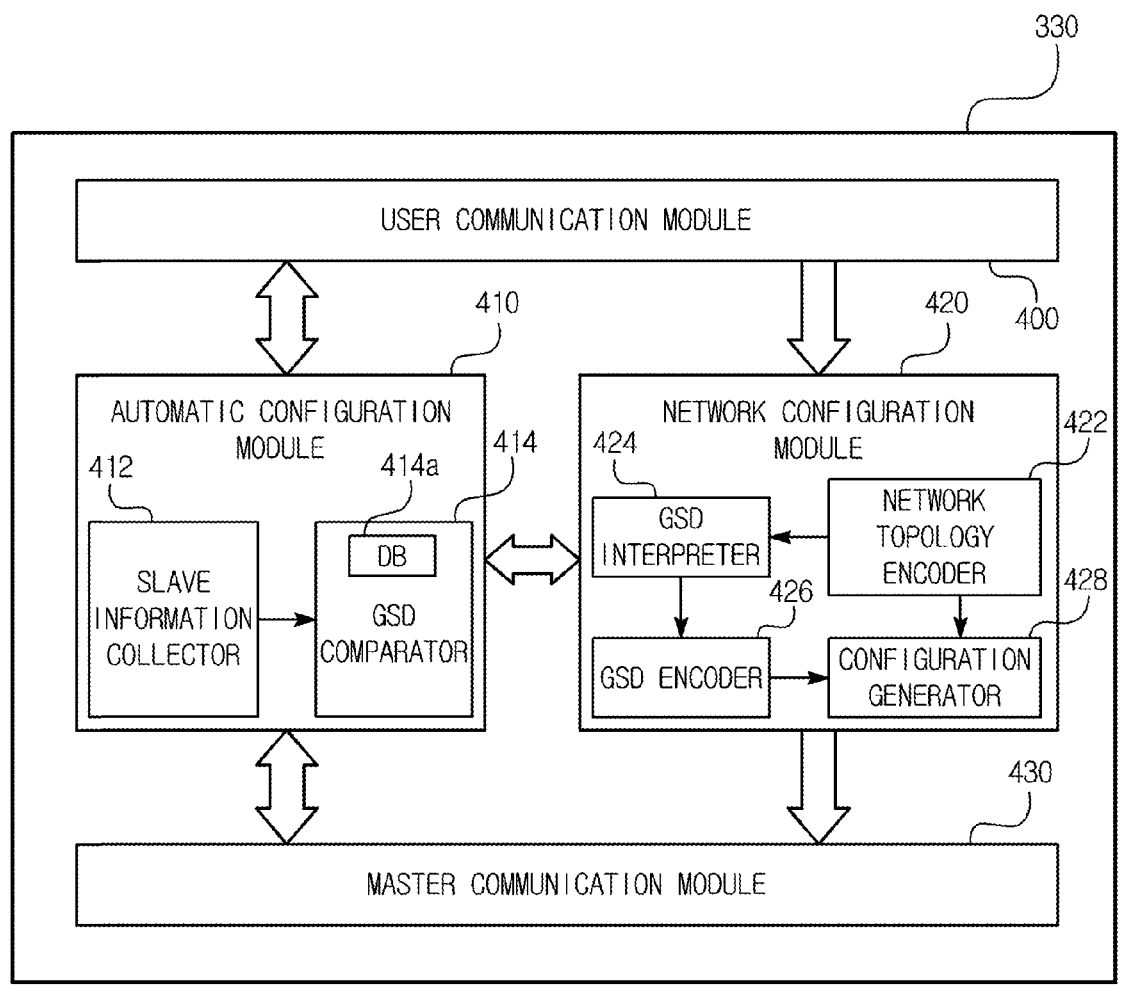
FIG. 4 is a schematic view illustrating an inner configuration of configuration tool in a network configuration apparatus according to an exemplary embodiment of the present disclosure.

FIG. 4 is a schematic view illustrating an inner configuration of configuration tool in a network configuration apparatus according to an exemplary embodiment of the present disclosure.

Referring to FIG. 4, the configuration tool according to the present disclosure may include a user communication module (400), an automatic configuration module (410), a network setting module (420) and a master communication module (430).

The user communication module (400) inputs network topology information drawn by a user through a command or UI (User Interface). The automatic configuration module (410) processes an automatic setting command inputted through the user communication module (400), and may include a slave information collector (412) and GSD (Generic Station Description) comparator (414). The slave information collector (412) requests the master device (300) of information on the plurality of slave devices (310), and collects the requested information of the plurality of slave devices (310).

The GSD comparator (414) compares the information of the plurality of slave devices (310) collected by the slave information collector (412) with information stored pre-stored in database (414*a*) to determine the types of the plurality of slave devices (310) and provides relevant profiles based on the determined types.

The network configuration module (420) generates setting of network topology and network configuration information in binary numbers, and may include a network topology encoder (422), a GSD interpreter (424), a GSD encoder (426) and a configuration generator (428).

The network topology encoder (422) uses the types of the plurality of slave devices determined by the GSD comparator (414) to encode the network topology, and provides communication speed information and time delay information relative to the plurality of slave devices (310).

The GSD interpreter (424) interprets the profiles of the plurality of slave devices (310) provided by the GSD comparator (414), and extracts information necessary for automatic network setting in response to the network topology encoded by the network topology encoder (422) from the interpreted profiles.

The GSD encoder (426) encodes the information necessary for automatic network setting that is provided by the GSD interpreter (424). The configuration generator (428) generates in binary numbers the communication speed information and the time delay information provided by the network topology encoder (422) and the information encoded by the GSD encoder (426). The master communication module (430) performs communication with the master device (300) to receive information of the plurality of slave devices, and transmits to the master device (300) the generated configuration binary numbers generated by the configuration generator (428).

Figure 5:
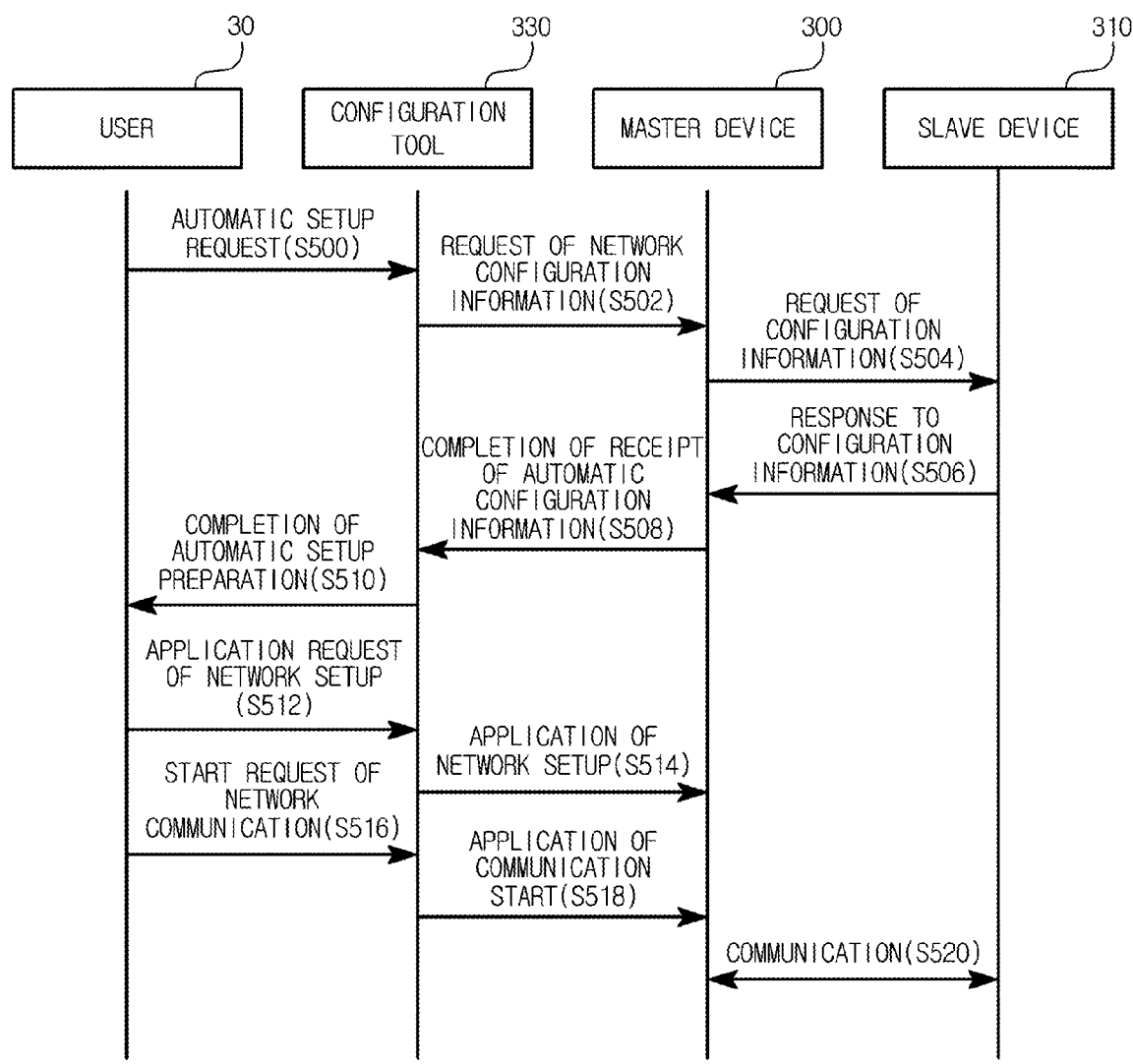
FIG. 5 is a schematic view illustrating a sequence of network configuration operation according to the present disclosure.

FIG. 5 is a schematic view illustrating a sequence of network configuration operation according to the present disclosure.

Referring to FIG. 5, when the network is automatically set up, the user (30) manipulates the configuration tool (330) to request the automatic setting of the network (S500). An automatic set-up request signal of the network is inputted to the automatic configuration module (410) through the user communication module (400) of the configuration tool (330).

Successively, the slave information collector (412) of the automatic configuration module (410) performs the communication with the master device (300) through the master communication module (430) in response to the automatic setup request of the network to request the automatic configuration (setup) information (S502).

The master device (300) performs the communication with the plurality of slave devices (310) through the Profibus (320) in response to the request of the automatic configuration information to request the configuration information necessary for automatic setup of the network (S504). The plurality of slave devices (310), in response to the request of the configuration information, provides the configuration information to the master device (300) (S506). For example, the plurality of slave devices (310) provides the configuration information on the types of slave devices.

Under this state, when all the configuration information is received from the plurality of slave devices (310), the master device (300) provides the configuration information to the configuration tool (330) to notify that the receipt of automatic configuration information is completed (S508), and the configuration tool (330) notifies the user (30) of the completion of preparation of automatic network setup in response to the completion of the receipt of the automatic configuration information (S510).

Furthermore, the configuration information is inputted into the slave information collector (412) of the automatic configuration module (410), where the slave information collector (412) collects the configuration information of the plurality of slave devices (310), where the collected configuration information is inputted into the GSD comparator (414).

The GSD comparator (414) is formed with the database (414*a*) in which data including information on the types of slave devices and profiles of relevant types are pre-stored. The GSD comparator (414) compares the configuration information on the plurality of slave devices (310) inputted from the slave information collector (412) with the information of the types stored in the database (414*a*) to determine what the types of the plurality of slave devices (310) are.

Furthermore, the GSD comparator (414) reads out the data including relevant profiles of the determined types from the database (414*a*) and provides the data to the network configuration module (420).

Under this circumstance, the user (30) determines that the preparation of network automatic setup is completed and requests the application of the network setup (S512). A network setup application request signal is inputted to the network configuration module (420) through the user communication module (400). The network topology encoder (422) of the network configuration module (420) performs the encoding operation by configuring a network topology according to the types of the plurality of slave devices (310) confirmed by the GSD comparator (414).

Furthermore, the network topology encoder (422) provides the encoded network topology to the GSD interpreter (424), and also provides the communication speed information on the confirmed types of the plurality of slave devices (310) and the time delay information to the configuration generator (428).

The GSD interpreter (424) interprets the data including the profiles according to the network topology to extract information necessary for automatic network setup, and provides the extracted information encoded by the GSD encoder to the configuration generator (428).

The configuration generator (428) converts the communication information including the communication speed information provided by the network topology encoder (422) and the time delay information and the information encoded by the GSD encoder (426) and generates in configuration binary numbers applicable to the master device (300). The configuration binary numbers thus generated is transmitted by the configuration generator (428) to the master device (300) through the master communication module (430) to be applicable as network configuration information (S514).

Under a state where the network configuration information generated in binary numbers is transmitted to the master device (300), the user (30) requests the configuration tool (330) of the start of the network communication (S516), and the configuration tool (330) requests the master device (300) of the start of the network communication in response to the request (S518). Then, the master device (300) performs the communication with the plurality of slave devices (310) through the Profibus (320) according to the newly set-up network configuration information (S520).

While the present disclosure may have been disclosed with respect to several exemplary embodiments, such features or aspects may be variably modified by those skilled in the art, provided they come within the scope of the appended claims.

The above-mentioned apparatus for setting network of Profibus DP according to the present disclosure may, however, be embodied in many different forms and should not be construed as limited to the embodiments set forth herein. Thus, it is intended that embodiments of the present disclosure may cover the modifications and variations of this disclosure provided they come within the metes and bounds of the appended claims and their equivalents.

What is claimed is:

1. An apparatus for setting a network of a PROcess Field Bus (PROFIBUS) Decentralized Periphery (DP), the apparatus comprising:
    a master device;
        a plurality of slave devices configured to perform a communication with the master device through a Process field bus; and
        a configuration tool configured to generate network configuration information of the Profibus DP and provide the configuration information to the master device,
    wherein the configuration tool includes an automatic configuration module configured to request the master device of information relative to the plurality of slave devices in response to an automatic configuration command inputted through a user communication module, to receive the information and provide profiles of relevant types by determining the types of the plurality of slave devices using the received information, and a network configuration module configured to generate the network configuration information in response to the types and profiles determined by the automatic configuration module and to provide the network configuration information to the master device;
    the master device requests, from the plurality of slave devices, the configuration information necessary for automatic configuration in response to the automatic configuration request of the automatic configuration module; and
    the plurality of slave devices respectively provide to the master device the configuration information on which device type, among a plurality of slave device types, a respective slave device is among the plurality of slave device types,
    wherein the automatic configuration module includes a slave information collector configured to request information on the plurality of slave devices to the master device, and to collect the requested information of the plurality of slave devices, and a GDS (Generic Station Description) comparator configured to determine the types of plurality of slave devices by comparing the information of the plurality of slave devices collected by the slave information collector with information pre-stored in database, and to provide a profile corresponding to the determined types to the network configuration module by reading out the profile from the database.

2. The apparatus of claim 1, wherein the network configuration module includes a network topology encoder configured to generate a network topology according to the types determined by the automatic configuration module, encode the network topology and provide the encoded network topology and communication information, a GDS interpreter configured to interpret the profile according to the network topology and to extract data necessary for the network configuration information, a GSD encoder configured to encode the data extracted by the GSD interpreter, and a configuration generator configured to generate the network configuration information by converting the data encoded by the GSD encoder and the communication information provided by the network topology encoder to a binary data, and to provide the generated network configuration information to the master device.

3. The apparatus of claim 1, wherein the configuration tool further includes a master communication module configured to perform a communication with the master device.

* * * * *